United States Patent [19]

Poznański et al.

[11] Patent Number: 5,848,385
[45] Date of Patent: Dec. 8, 1998

[54] MACHINE TRANSLATION SYSTEM USING WELL FORMED SUBSTRUCTURES

[75] Inventors: Victor Poznański; John Luis Beaven, both of Oxford; Ian George Johnson, Hampshire, all of United Kingdom

[73] Assignee: Sharp Kabushiki Kaisha, Osaka, Japan

[21] Appl. No.: 562,686

[22] Filed: Nov. 27, 1995

[30] Foreign Application Priority Data

Nov. 28, 1994 [GB] United Kingdom .................... 9423995

[51] Int. Cl.⁶ ...................................................... G06F 17/28
[52] U.S. Cl. ............................................................ 704/4
[58] Field of Search .................... 704/2, 4, 5, 9

[56] References Cited

U.S. PATENT DOCUMENTS 5,321,607  6/1994  Fukumochi et al. .
5,369,574 11/1994  Masegi et al. ................................ 704/9
5,416,696  5/1995  Suzuoka ...................................... 704/2

FOREIGN PATENT DOCUMENTS 0568319 11/1993  European Pat. Off. .
2122782  1/1984  United Kingdom .

OTHER PUBLICATIONS

European Search for Application No. 95308512.3; Dated May 13, 1997.

Search Report for UK Appl. 9423995.1, Mailed Jan. 9, 1995.

Whitelock, Sharp Lab., UK, Process of Coling, Aug. 1992, pp. 784–791, "Shake–and–Bake Translation".

Beaven, Process of Colena, Aug. 1992, pp. 602–609, "Shake–and–Bake Machine Translation".

Brew, Proc. of Coling, Aug. 1992, pp. 610–616, "Letting the Cat out of the Bag: Generation for Shake–and–Bake Kit".

*Primary Examiner*—Edward R. Cosimano
*Assistant Examiner*—Barton L. Bainbridge

[57] ABSTRACT

Source language text from an input interface is broken down into source language morphemes by a morphological analyzer. A syntactic analyzer converts the morphemes into source language signs labelled with identifiers and data identifying other signs which are grammatically related. A bilingual equivalence transformer transforms the source language signs to target language signs which are combined by a combiner to provide a first attempt at a target language structure. The structure is repeatedly evaluated by an evaluator and transformed by a transformer. The signs of well formed substructures identified by the evaluator are not dissociated from each other by the transformer. This process ends when either the whole target language structure is evaluated as being well formed or all transformations have been unsuccessfully evaluated.

9 Claims, 11 Drawing Sheets

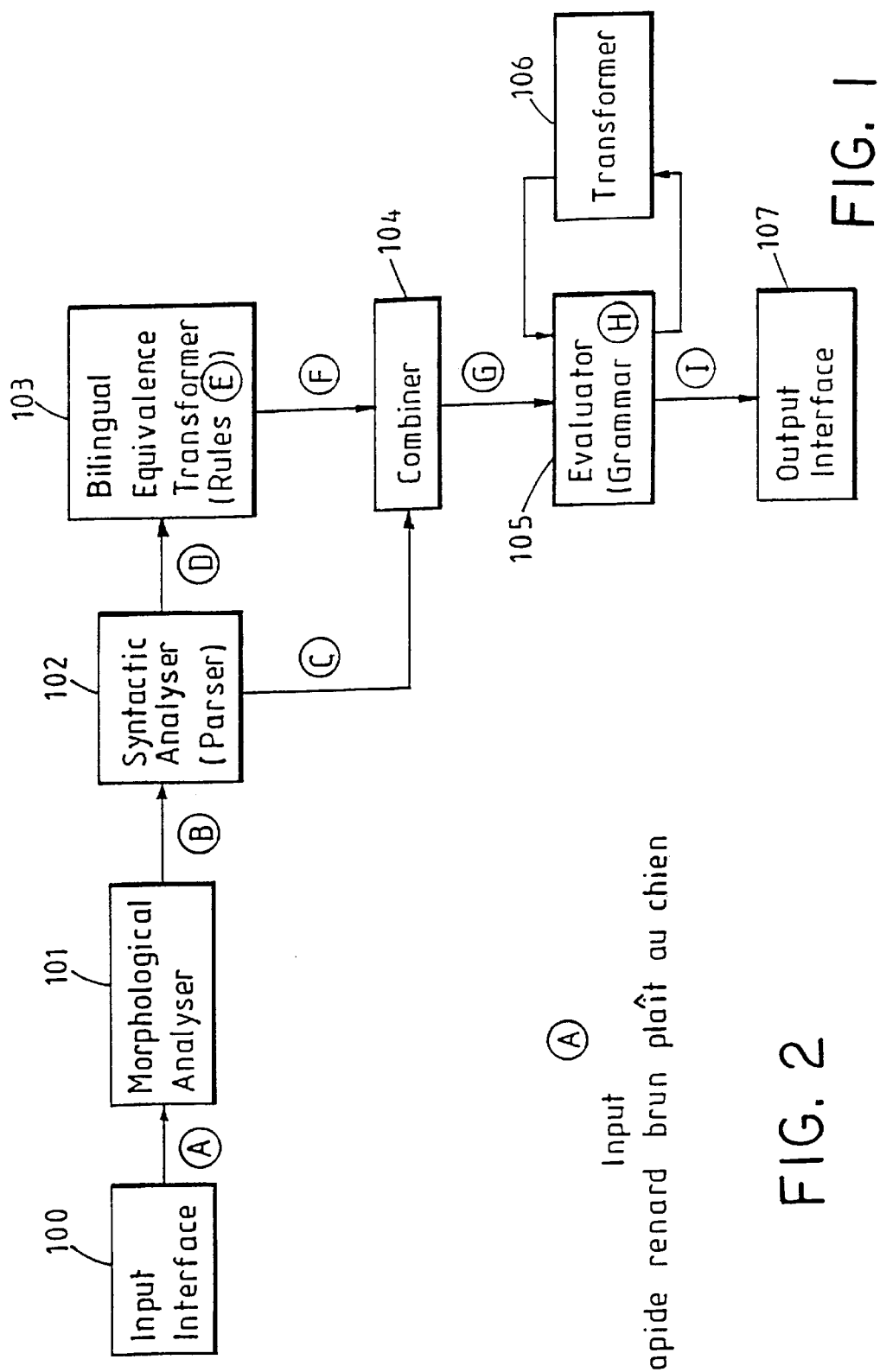

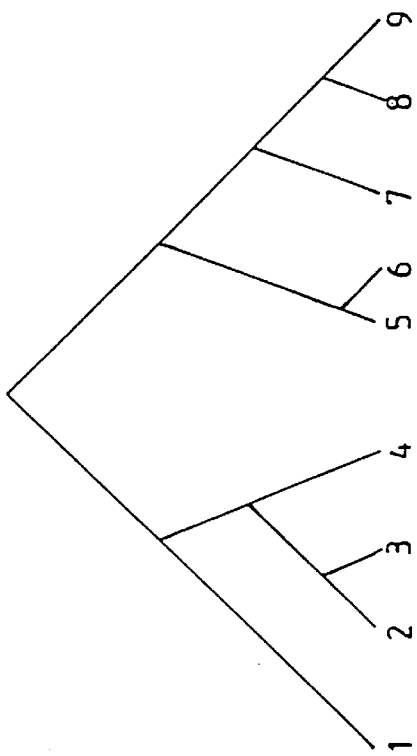

Ⓓ

Index = 1
Modifies = 3
Spelling = Le

Index = 2
Modifies = 3
Spelling = Rapide

Index = 3
Spelling = Renard

Index = 4
Modifies = 3
Spelling = Brun

Index = 5
Subject = 3
Object = 9
Spelling = Plaire

Index = 6
Modifies = 5
Spelling = Present

Index = 7
Modifies = 9
Spelling = à

Index = 8
Modifies = 9
Spelling = Le

Index = 9
Spelling = Chien

(i)  Le ← The
    Modifies = Modifies
    Index = Index (ii) Rapide ← Quick
    Modifies = Modifies
    Index = Index (iii) Brun ← Brown
    Modifies = Modifies
    Index = Index (iv) Plaire à ← to Like
    Subject = Object
    Object = Subject
    Index (à) = New Index
    Index (plaire) = Index (Like)
    Modifies (à) = Subject (v) Renard ← Fox
    Index = Index (vi) Chien ← Dog
    Index = Index (vii) Present ← Present
    Modifies = Modifies
    Index = Index

```
Index    = 1
Modifies = 3
Spelling = THE
```

```
Index    = 2
Modifies = 3
Spelling = QUICK
```

```
Index    = 3
Spelling = FOX
```

```
Index    = 4
Modifies = 3
Spelling = BROWN
```

```
Index    = 5
Subject  = 9
Object   = 3
Spelling = LIKE
```

```
Index    = 6
Modifies = 5
Spelling = PRESENT
```

```
Index    = 8
Modifies = 9
Spelling = THE
```

```
Index    = 9
Spelling = DOG
```

(a) S ⟶ NP    VP
Subject (VP) = Index (NP)

(b) NP ⟶ DET    $\overline{N}$
Modifies (DET) = Index (NP)
Index = Index ($\overline{N}$)

(c) $\overline{N}$ ⟶ N    |  Adj$_1$  $\overline{N}_1$
Index = Index (N)    Index = Index ($\overline{N}_1$)
                                Modifies (Adj) = Index ($\overline{N}_1$)

(d) $\overline{N}$ ⟶ $\overline{N}_1$    |  Adj$_2$  $\overline{N}$
Index = Index ($\overline{N}_1$)    Modifies (Adj$_2$) = Index ($\overline{N}$)
                                  Index = Index ($\overline{N}$)

(e) VP ⟶ $\overline{V}$  NP
Object ($\overline{V}$) = Index (NP)
Subject ($\overline{V}$) = Subject (VP)

(f) $\overline{V}$ ⟶ V    Tense
Modifies (Tense) = Index (V)
Subject = Subject (V)
Object = Object (V)

S    = Sentence
  NP   = Noun Phrase
  VP   = Verb Phrase
DET  = Determiner
   N    = Noun
 Adj  = Adjective
   V    = Verb

FIG. 10

G4
```
        N̄
Index    = 3
Spelling = quick fox
```

G6
```
        V̄
Index    = 5
Subject  = 9
Object   = 3
Spelling = likes
```

G7
```
        NP
Index    = 9
Spelling = the dog
```

FIG. 11

MACHINE TRANSLATION SYSTEM USING WELL FORMED SUBSTRUCTURES

TECHNICAL FIELD OF THE INVENTION

The present invention relates to a machine translation system.

BACKGROUND OF THE INVENTION

There are several known machine translation systems which are based on the "lexical-semantic transfer" approach disclosed in Whitelock, Proc. of COLING-92, Aug. 23–28, 1992, "Shake-and-Bake Translation". All of these may be conceptually segmented in terms of a computing system which takes a sentence as input. The input is passed into modules which convert the fundamental linguistic elements from their original language into the language in which they are to be translated and reassemblies them in a grammatical manner. On successful reassembly, the translated sentence is extracted from the translated language structure and output. The various modules are as follows:

1. A "parsing module" analyses the sentence to be translated (the source sentence) and extracts the resulting lexical items or lexical signs (items from a dictionary for the source language made grammatically more specific by the analysis just performed).
2. A "transfer module" translates the source language lexical items into sets of lexical items in the target language. For this process to work, some of the critical semantic information inferred from the source analysis must also be maintained between the target signs. This is the origin of the term "lexical-semantic transfer".
3. A "generation module" reduces the collection of target signs into a grammatical structure by trying to reduce arbitrary combinations of them by either:
   (a) Producing arbitrary permutations of a structure that might fit the target-language lexical signs because one of the structures should eventually be correct (this is also known as "generate-and-test").
   (b) Eliminating impossible structures by a system of constraints.

However, both of these approaches are undirected in that there is no systematic means of assembling a target language structure. It is this arbitrary aspect of their operation that makes them computationally prohibitively expensive to use for general translation.

4. If the generation module succeeds in producing a grammatical structure, an "output module" extracts its orthography (spelling), which has been obtained using the various grammatical rules or constraints applied in the previous step, giving the translated sentence (the target sentence).

A problem with the generate-and-test technique, as mentioned above, is that it can require a large amount of processing time in order either to arrive at a correct translation or to exhaust all the possible structures and give up. For instance, where there are X target signs to be formed into a grammatical structure, the system will try all possible permutations of these signs. For many source language sentences, a correct structure will be found after a reasonable amount of processing time. However, for many sentences, a large proportion of all the possible permutations will be tried before a correct structure is derived. For some sentences which the system is incapable of translating, all of the permutations will have to be tried before the system admits defeat and moves on to another sentence. In such cases, the number of permutations is Xl (factorial X). For sentences where X is a relatively small number, for instance of the order of five or six, this does represent a disadvantage. However, for source language sentences giving rise to, for instance, ten or more target language signs, such systems will not admit failure until millions of attempts have been made. This results in the system becoming intractable when embodied by currently available data processing systems because the processing speeds of such systems are insufficient to allow translation to be performed within a viable time frame. For complex source language sentences, the required processing time before admitting failure may become days, years or even more millennia than the anticipated life of the universe.

EP 0 568 319 discloses an arrangement which represents a development of the basic "shake-and-bake" machine translation system. This arrangement identifies all possible pair-wise combinations of the target language signs so as to form a set of relationships. The system then explores the ways in which the pair-wise combinations can be assembled into a layer structure. Any structure which fails, for instance because not all of the signs are used in the structure, is rejected and a totally new structure is tried.

SUMMARY OF THE INVENTION

According to one aspect of the invention, a machine translation system is provided for translating text in a source language to text in a target language. The system includes an input interface for putting text in the source language into the system and an analyser for analysing a grammatically complete section of the input text into source language signs, each of which has an associated label comprising an identifier for identifying the sign and data identifying any other sign to which the sign is grammatically related. The system further includes a first transformer for transforming the source language signs to target language signs including transforming the identifiers and the data. In addition, the system includes a combiner for combining the target language signs into a target language structure such that each target language sign is associated with at least one other target language sign.

Furthermore, the system includes an evaluator for evaluating the target language structure so as to identify, from the identifiers and the data of the target language signs, well formed substructures and target language signs not forming part of a well formed substructure; and a second transformer for transforming the target language structure without dissociating from each other target language signs forming well formed substructures identified by the evaluator. The evaluator and the second transformer alternately evaluate and transform the target language structure.

The term "grammatically complete section of text" means any section of test which is essentially complete in itself. Generally, this will be a sentence but alternatives include a clause or a phrase.

It is thus possible to provide a machine translation system which is capable of being embodied by currently available data processing systems and which is a tractable system. In other words, the system will either succeed in translating, for instance, a sentence or will explore all possible target language structures and give up in a reasonable time. For instance, for X target language signs, the maximum number of transformations which will be performed before giving up is believed to be less than $X^3$ or a reasonably low order polynomial in X. In practice, far fewer transformations than this may well be sufficient. Thus, the possibility of the system effectively becoming locked in an undesirable mode can be prevented.

The system provides improved efficiency by preserving well formed substructures in the sense that such substructures can be added to if appropriate but one not broken up after being tried. Thus, convergence to a complete translation, when such is possible, will occur more quickly than with known systems, for instance of the type disclosed in EP 0 568 319.

BRIEF DESCRIPTION OF THE DRAWINGS

The invention will be further described, by way of example, with reference to the accompanying drawings, in which:

FIG. 1 is a block schematic diagram of a machine translation system constituting a preferred embodiment of the invention; and FIGS. 2 to 15 illustrate information produced during operation of the system of FIG. 1.

DESCRIPTION IF THE PREFERRED EMBODIMENTS

Figure 5:
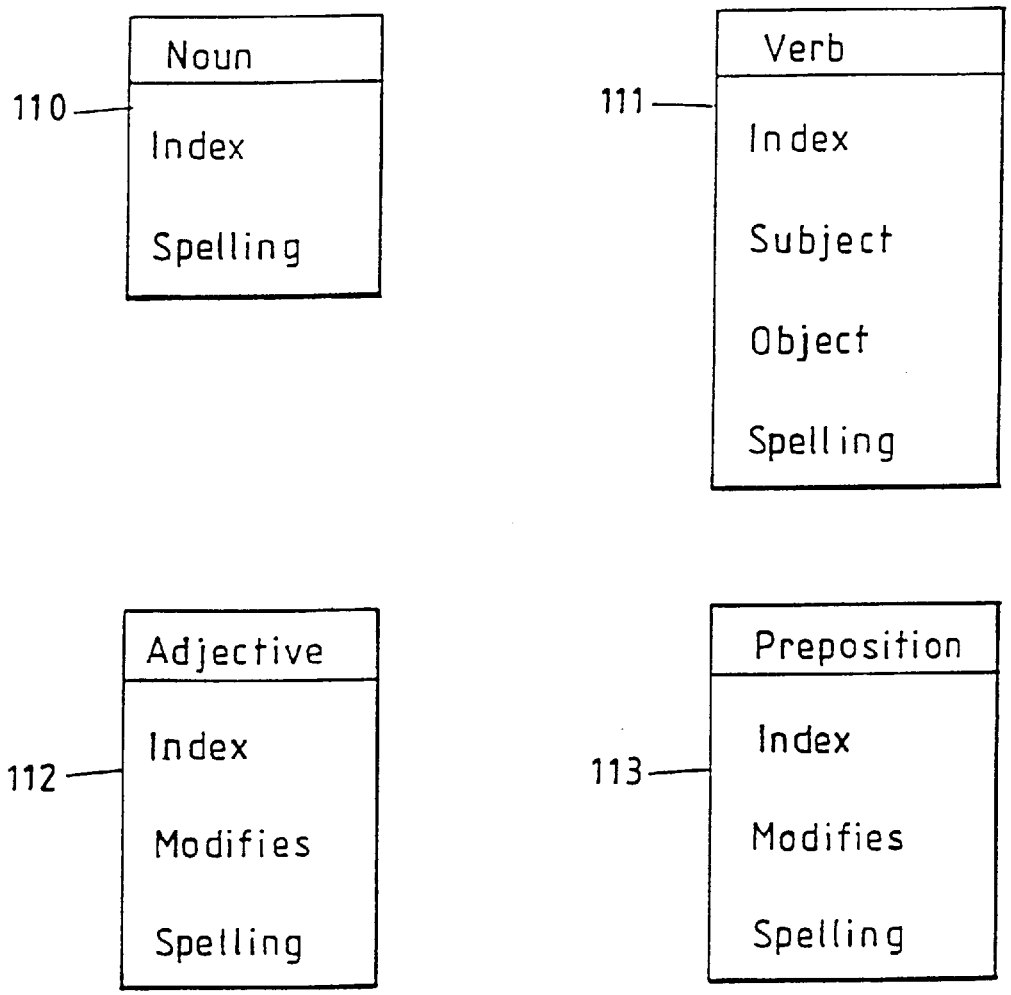

The machine translation system shown in FIG. 1 may be embodied by hardware which is dedicated to performing the operations which will be described hereinafter. However, in general, the system will be embodied by a programmable data processor controlled by suitable software, for instance stored in semiconductor or magnetic memory. From the drawings and following description, the person skilled in the art will readily be able to make dedicated hardware or write dedicated software for controlling programmable hardware.

The system shown in FIG. 1 comprises an input interface 100 which permits text in a source language to be entered into the system. For instance, the input interface 100 may comprise a keyboard or magnetic disc reader. The output of the interface is connected to a morphological analyzer 101 which analyses the input text into the most basic language units, which are known as morphemes and which comprise base forms of the words and affixes (prefixes and suffixes) which modify the base forms.

The morphemes from the analyzer 101 are supplied to a syntactic analyzer or parser 102 which applies rules of the source language grammar to the morphemes so as to define the grammatical relationships between the morphemes. This information is supplied to a bilingual equivalence transformer 103. In addition, the analyzer 102 derives a "tree" which defines how the morphemes were combined in the source language.

The morphemes together with their associated data are known as "signs" and are supplied to the bilingual equivalence transformer 103. The transformer 103 applies bilingual equivalence rules which cause each source language sign to be replaced by an equivalent target language sign such that each source language morpheme is transformed to its equivalent target language morpheme and the grammatical data of each source language sign is transformed into corresponding grammatical data for the target language. The transformer 103 thus produces output language signs which are supplied to a combiner 104.

The combiner 104 combines the target language signs so as to make an initial attempt at forming the target language equivalent of the input text. The combiner defines a target language tree (a parsing tree) which may be of any predetermined or random structure. However, because parsing trees in many languages have substantial similarities, the combiner 104 preferably makes use of the source language parsing tree from the analyzer 102 to make a first attempt at the target language text.

The linguistic structure defined by the source language parsing tree and the target language signs is supplied to an evaluator 105 which evaluates the validity of the first attempt at the target language text by applying a set of target language grammar rules to the signs. If the evaluation is successful, the textual information is passed to an output interface 107 which supplies the output text of the system, for instance to a printer, visual display unit, or memory. If the evaluation is not successful, then the structure is transformed in a transformer 106 so as effectively to alter the parsing tree without destroying any part of the structure which has been evaluated as being correct and reevaluation is performed by the evaluator 105. Each transformation should have the effect of improving the structure so that the structure converges on a correct target language translation. Alternatively, if the system cannot produce a correct translation, it will fail after a relatively small number of iterations and pass on to another input sentence. If the system does not fail, this process is repeated until evaluation is successful and the signs and correct structure can be passed to the output interface 107. Thus, the morphemes are transformed into the correct target language text units i.e. words, placed in the correct target language order.

In order to explain the operation of the system shown in FIG. 1 more clearly, a specific example will be described in detail showing the steps in translating a sentence in French (the source language) to the equivalent sentence in English (the target language). FIG. 2 shows the input text A provided by the input interface 100 as the French sentence "Le rapide renard brun plaît au chien". This text is supplied to the morphological analyzer, which replaces each word of the French text by the equivalent morpheme or morphemes. The morphemes are shown in FIG. 3 as the information B supplied by the analyzer 101. The morphemes are supplied to the syntactic analyzer 102 which performs a parsing operation by applying the rules of French grammar so as to derive a parsing tree as illustrated in FIG. 4. Indices are allocated to the morphemes, for example, in accordance with the order of the morphemes which in turn corresponds largely to the order of the words in the French text. Thus, the first morpheme (index=1) is the word "Le", the second morpheme (index=2) is the French word "rapide", and so on. The finite verb "plaît" is replaced by two morphemes having indexes 5 and 6. The fifth morpheme is the infinitive verb "plaire" and the sixth morpheme is "present" to indicate the present tense of the verb in the input text. Similarly, the seventh and eighth morphemes break down the French word "au" into "à" and "le". Thus, the fifth, seventh, and eighth morphemes represent base forms whereas the sixth morpheme represents an affix of the fifth morpheme.

As a result of the parsing operation which defines the syntactic relationships between the morphemes, the syntactic analyzer 102 labels each morpheme with certain data indicating the relationships between the morphemes so as to produce the French signs. FIG. 5 illustrates the information produced by the analyzer 102 so as to label several different types of morphemes. Thus, for a morpheme comprising a French noun, the sign comprises a label 110 indicating that the morpheme is a noun, allocating its index, and giving the spelling of the morpheme. A verb sign 111 similarly comprises the allocated index and the spelling of the morpheme. In addition, the sign includes the index of the morpheme which is the subject of the verb and the index of the morpheme which is the object of the verb in the source language (French).

Signs for adjectives and prepositions are shown at 112 and 113. Each of these comprises the index of the morpheme, its spelling, and the index of the morpheme to which it is grammatically related.

FIG. 6 illustrates the signs D produced by the analyzer 102 corresponding to the French sentence shown in FIG. 2. The first sign is labelled with index 1 corresponding to the first morpheme. It modifies the morpheme with index 3 and has the spelling "le". The second sign corresponding to the second morpheme has index 2, modifies the third morpheme (index 3), and has the spelling "rapide". The third sign corresponding to the third morpheme has index 3 and spelling "renard". The fourth sign corresponding to the fourth morpheme has index 4, modifies morpheme 3, and has spelling "brun".

The fifth sign has index 5 corresponding to the fifth morpheme, is a verb whose subject is morpheme 3 and whose object is morpheme 9, and has the spelling "plaire". The sixth sign corresponds to the sixth morpheme and has index 6, modifies the fifth morpheme, and has the spelling "present" indicating the present tense. The seventh sign corresponds to the seventh morpheme and has index 7, modifies morpheme 9, and has the spelling "à". The eighth sign has index 8 corresponding to the index of the eighth morpheme, modifies the ninth morpheme, and has spelling "le". The ninth sign has index 9 and has the spelling "chien".

The French signs are supplied to the transformer 103 which applies a set of bilingual equivalence rules so as to transform the French signs into the equivalent English signs. These equivalence rules amount effectively to a bilingual dictionary in which the spelling of each French sign is replaced by the spelling of the English sign and the labels of the French signs are replaced by the equivalent labels of the English signs. The rules E relating to the signs illustrated in FIG. 6 are shown in FIG. 7. In the case of the rules (i) to (iii) and (v) to (viii) each English sign has the same modifier and index number as the corresponding French sign so that the only difference is in the "spelling label" where the French morpheme is replaced by the English morpheme. However, in the case of rule (iv), the transformer 103 recognises the fifth and seventh signs illustrated in FIG. 6 and transforms the labels as shown in FIG. 7. Thus, the infinitive verb "plaire" together with the preposition "à" is recognised as corresponding to the English infinitive verb "to like" and the spelling is transformed accordingly. However, the rule recognises that, in translating between French and English, the subject and object have to be reversed. Thus, whereas the French sign with index 5 has as its subject and object the morphemes with indices 3 and 9, respectively, the English sign has the morpheme of index 3 as its object and the morpheme of index 9 as its subject. The index remains unchanged. The other transformations illustrated by rule (iv) in FIG. 7 are required for translation from English to French and need not therefore be further described for the purposes of explaining this example.

FIG. 8 shows the English signs F produced by the transformer 103 as corresponding to the French signs shown in FIG. 6. Thus, by applying rule (i) of FIG. 7 to the first French sign shown in FIG. 6 (index 1), the spelling changes from "le" to "the", the index of the English sign is equal to 1 i.e. the same as the corresponding French sign, and the sign modifies the morpheme with the index 3 as in the case of the French sign. Similarly, English signs 3, 4, 6, 8, and 9 are unchanged in respect of their index and the modifier (the index of the morpheme which each modifies) so that only the spelling differs corresponding to the transformation from French to English. The fifth sign, as described above, corresponds to the fifth French sign but with the subject and object indices exchanged.

Figure 9:
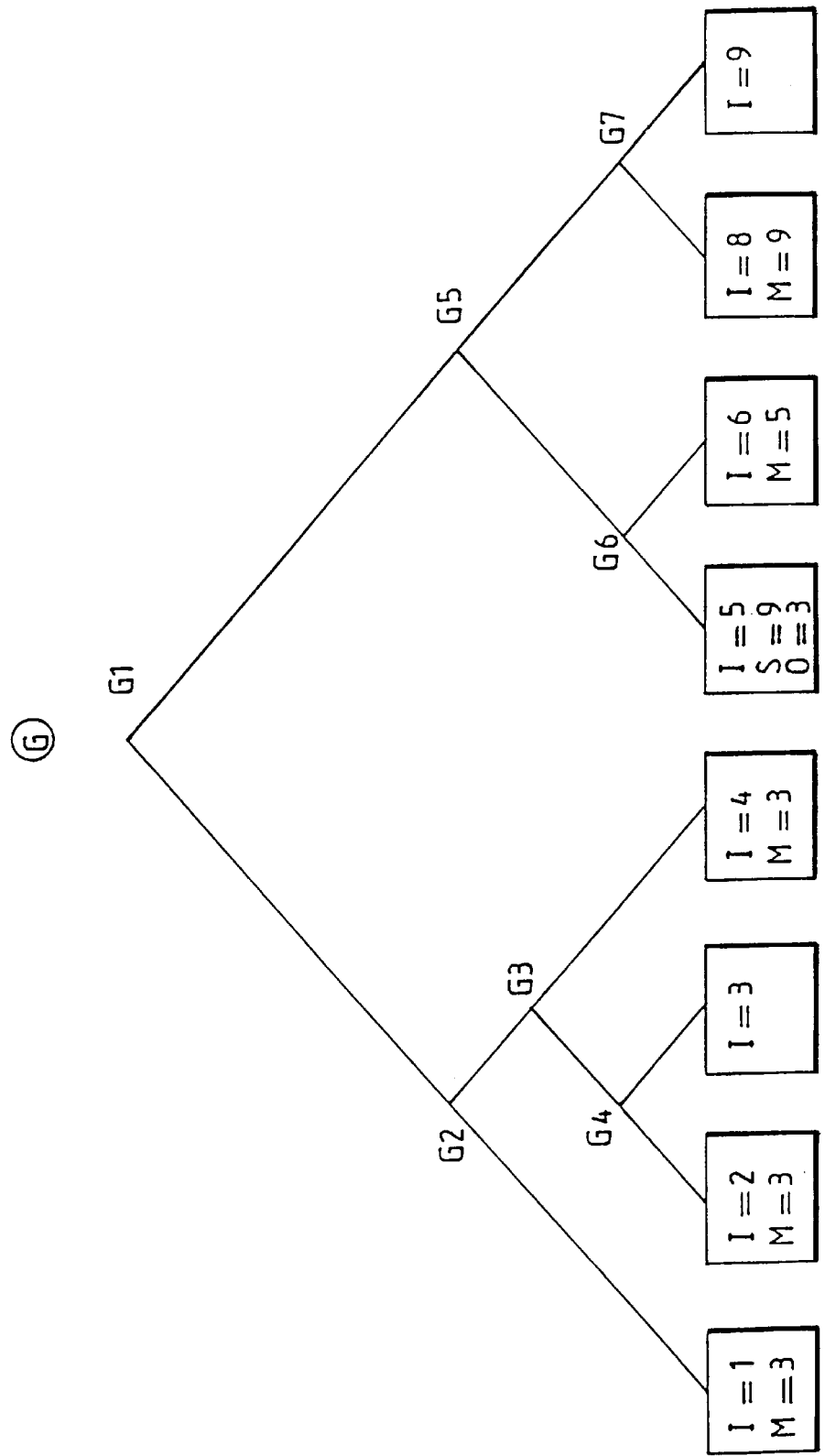

The combiner 104 takes the English signs shown in FIG. 8 and combines these in accordance with the parsing tree C shown in FIG. 4 and derived from the French syntax by the analyzer 102. In FIG. 9, the signs are shown as boxes with the labels abbreviated such that "I" stands for "index", "M" stands for "modifies", "S" stands for "subject", and "O" stands for "object". The French sign with index 7 is not present in FIG. 9 since the transformer 103 has recognised that this effectively forms part of the verb in French and there is no separate English sign for this. In other words, the English sign with index 5 represents both French signs with indices 5 and 7. Otherwise, the signs are effectively arranged in order of their indices with the tree structure of FIG. 4 being applied thereto.

The tree structure illustrated in FIG. 9 is of the binary type in which each of the nodes G1 to G7 has two branches. Thus, the node G1 may be thought of as a "trunk" node having two branches which extend to the nodes G2 and G5. The lowest level of nodes, referred to as "leaf nodes" comprises the signs themselves.

The information illustrated at G in FIG. 9 is supplied to the evaluator 105 which evaluates whether the structure in the target language (English) is correct. In order to do this, the evaluator applies a set of English grammar rules H which are illustrated in FIG. 10. In particular, FIG. 10 shows those English grammar rules which are sufficient to allow the signs and the structure of FIG. 9 to be evaluated. In FIG. 10, a vertical bar indicates an alternative.

Thus, the first rule effectively states that, if a node is connected to two sub-nodes representing a noun phrase followed by a verb phrase with the subject of the verb phrase being identical to the index of the noun phrase, then the node is well formed and represents a sentence. The second rule states that, if a node is connected to two sub-nodes representing a determinant followed by a noun "sub-phrase" with the determinant modifying the noun phrase, then the index of the noun phrase is equal to the index of the noun sub-phrase. In other words, that node may then be given a label in which the index is equal to the index of the noun phrase.

The third rule states that, if a node is connected to one or two subsidiary nodes, then there are two possibilities for defining the node as well formed and labelling it. If there is a single subsidiary node which represents a noun, then the node is well formed and is labelled with the same index as the noun. Alternatively, if the node is connected to two nodes which represent an adjective followed by a noun, and if the adjective modifier is equal to the index of the noun (i.e. the adjective modifies that noun), then the node is well formed and is assigned an index equal to the index of the noun.

The remaining rules are illustrated in FIG. 10 together with a definition of the abbreviations Thus, rules (a) to (f) are used by the evaluator 105 to evaluate the structure illustrated by the parsing tree shown in FIG. 9.

In addition to the grammar rules illustrated in FIG. 10, the evaluator 104 applies a further set of rules amounting to an algorithm for evaluating the structure shown in FIG. 9. Initially, the nodes G1 to G7 are labelled as having not been evaluated. If the node has already been evaluated and therefore has already been labelled with an index, the node is unchanged. If the node is a leaf node i.e. has no sub-nodes or "children", it is labelled with the index of the target language sign to which it relates. If the node has not previously been successfully evaluated, it is evaluated on the basis of the labels of its sub-nodes or children. Finally, each evaluation begins at the top node or trunk (G1 in FIG. 9).

Applying the algorithm and grammar rules to the structure shown in FIG. 9, which represents the first attempt at the correct structure, the node G1 is found not to have been evaluated and an attempt is made to evaluate it on the basis of the children G2 and G5. The evaluator 105 chooses, for sake of argument, the left branch and attempts to evaluate the node G2 from the children G3 and the leaf node of index I=1. Although the leaf node has been given the index 1, the node G3 has not been evaluated. The evaluator therefore tries to evaluate the node G3 from its children and immediately notes that the node G4 has not been evaluated. The evaluator therefore attempts to evaluate the node G4.

As shown in FIG. 9, the node G4 is connected to leaf nodes having indices 2 and 3 representing an adjective followed by a noun, the adjective modifying that noun (M=3 for the adjective and I=3 for the noun). The evaluator applies the grammar rules H shown in FIG. 10 and determines that the second alternative of rule (d) applies to the node G4. The node G4 is therefore labelled as being well formed, as representing a noun sub-phrase, as having an index equal to that of the noun i.e. equal to 3, and as having as its spelling the spelling of the sign of index I-2 followed by the spelling of the sign of Index 1-3.

The evaluator 105 then performs the same algorithm for the right branch from the node G1 so as to evaluate the nodes G5 to G7. The node G5 has not already been evaluated and so the evaluator attempts to evaluate it from its children. The evaluator first determines that the node G6 has not been evaluated and attempts to evaluate it on the basis of the grammar rules H. The children of the node G6 are leaf nodes and comply with the rule (f). Thus, the node G6 is labelled as representing a finite verb whose index is 5, whose subject is 9, whose object is 3, and whose spelling is "likes".

Having exhausted the left branch from the node G5, the evaluator evaluates the right branch and finds that the node G7 has not yet been evaluated. The node G7 is evaluated from its children, which are leaf nodes and which fulfil the rule (b) shown in FIG. 10. Thus, the node G7 is labelled as a noun phrase with index 9 and having as its spelling the spelling of the sign of index I=8 followed by the spelling of the sign of index I=9.

This completes the initial evaluation by the evaluator 105 and labels of the nodes G4, G6 and G7 are shown in FIG. 11. Although the nodes G4, G6 and G7 have been successfully evaluated, the remaining nodes could not be evaluated and were therefore labelled as being not well formed. The structure illustrated in FIG. 9 is therefore incorrect and this is signalled to the transformer 106.

The transformer modifies the structure shown in FIG. 9 for re-evaluation but preserves the structure which as already been evaluated as being well formed. In particular, if a section of the tree below a node comprises only well formed nodes but the node itself is not well formed, then the section below that node is not disturbed in the sense of removing any nodes from it, although nodes may be added to it in subsequent steps. Thus, "sub-trees" which are wholly well formed do not need to be evaluated again but, if nodes are added, it is merely necessary to evaluate the added nodes. This limited re-evaluation is permissible provided the grammar fulfils certain constraints such that it is "monotonic". In this context, the term "monotonic" refers to grammars which are such that the structure is always improved on evaluation and transformation. Otherwise, when using more perverse grammars, partial or full re-evaluation of well formed sub-trees may be necessary.

By monotonic grammars, it is meant that firstly, the order of the orthography of two combining signs in the orthography of the result must be determinate—it must not depend on any subsequent combination that the result may undergo, and secondly that if a well-formed structure which is part of an ill-formed second structure becomes associated at the highest possible place inside another structure, the result will be well-formed after it is re-evaluated by the evaluator.

Thus, a "maximal tree fragment" comprises a well-formed tree fragment (i.e. all of its nodes are well formed) which is not part of a bigger well-formed fragment.

Figures 12, 13:
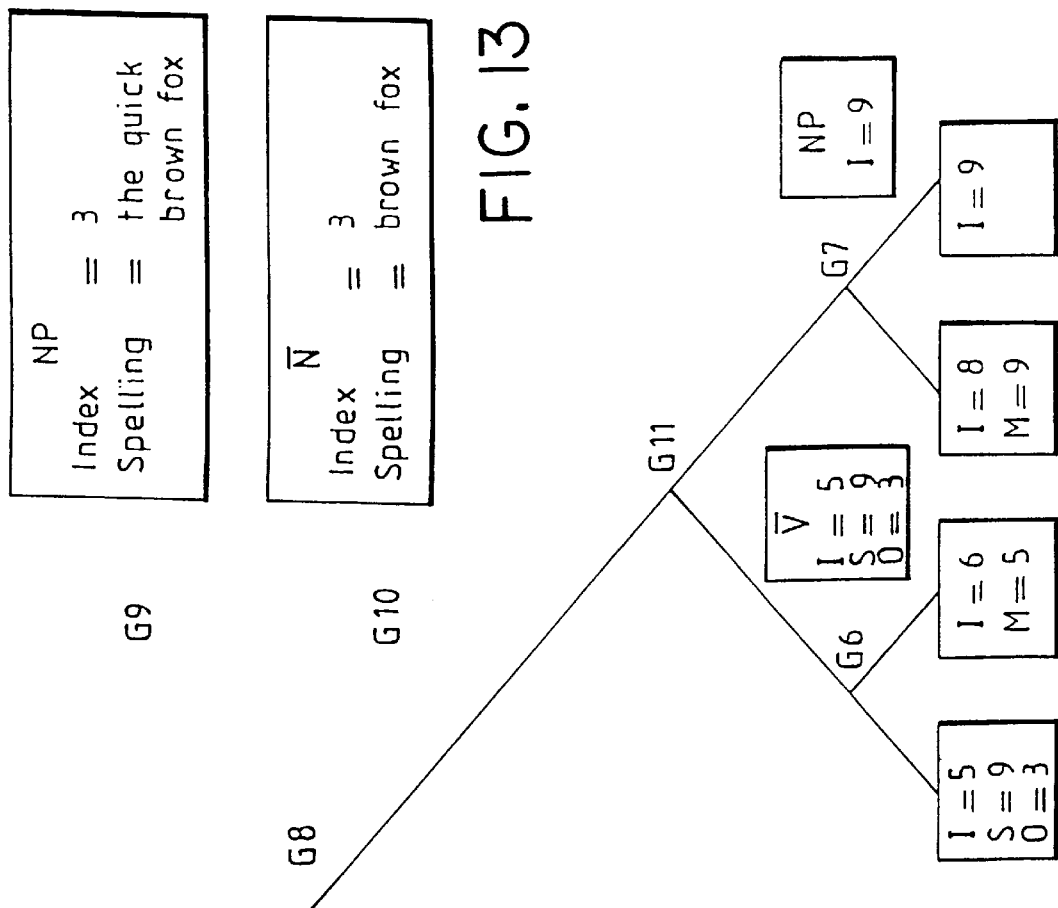

The transformer 106 chooses any maximal tree fragment which can combine with some other part of the tree. In the example shown in drawings, by testing the nodes in an arbitrary order, for instance going from right to left, the transformer 106 determines that the sign or leaf node with index 4 can be associated with the sign or leaf of index 3 because the former modifies the latter. The transformer therefore alters the structure in this way to produce the tree shown in FIG. 12. In FIG. 12, the nodes G4, G6, and G7 which were previously successfully evaluated and labelled are shown with their (abbreviated) labels in place. The evaluator 105 then evaluates the tree shown in FIG. 12 using the same grammar rules H and the same algorithm as before. Thus, the node G8 is not well formed and neither is the node G9. Its left branch connects to a leaf node which is therefore well formed and its right branch is connected to the node G4 which is well formed. The node G9 can therefore be evaluated as it fulfils the rule (b). Thus, the node G9 is labelled as being well formed as a noun phrase with index 3 and having as its spelling the spelling of the sign whose index is 1 followed by the spelling of the node G4. The node G10 may then be evaluated, if it has not already been evaluated during the transformation by the transformer 106, and fulfils rule (d) shown in FIG. 10. Thus, the node G10 is labelled as a noun sub-phrase of index 3. For the sake of simplicity, the rules which ensure that the adjectives having indices 2 and 3 appear in the correct order are not shown and will not be described.

The right branch from the node G8 is then evaluated by evaluating the node G11. The children G6 and G7 are well formed but do not satisfy any of the rules (a) to (f) of FIG. 10. Although the node G6 is labelled as a finite verb and the node G7 is labelled as a noun phrase, when the rule (e) is applied to the nodes G6 and G7 it is noted that the object O of G6 is equal to index 3 whereas the index I of the node G7 is equal to 9. Thus, although a finite verb and a noun phrase could combine to form a verb phrase, the noun phrase at the node G7 is not the object of the finite verb and the node G11 does not therefore fulfil the rule (e). Thus, the node G11 remains not well formed.

The labels of the nodes G9 and G10 are shown in FIG. 13.

The transformer 106 thus performs a further transformation of the tree shown in FIG. 11. The nodes G4, G6, G7, G9, and G10 are all now well formed and the transformer 106 thus does not disturb them. However, the node G11 is not well formed and the transformer therefore moves the maximal tree fragment comprising the node G6 and its leaf nodes to a place in the tree structure where there is a noun phrase of index 3 with which this maximal tree fragment representing a finite verb can possibly combine successfully. The modified structure is shown in FIG. 14.

Figures 14, 15:
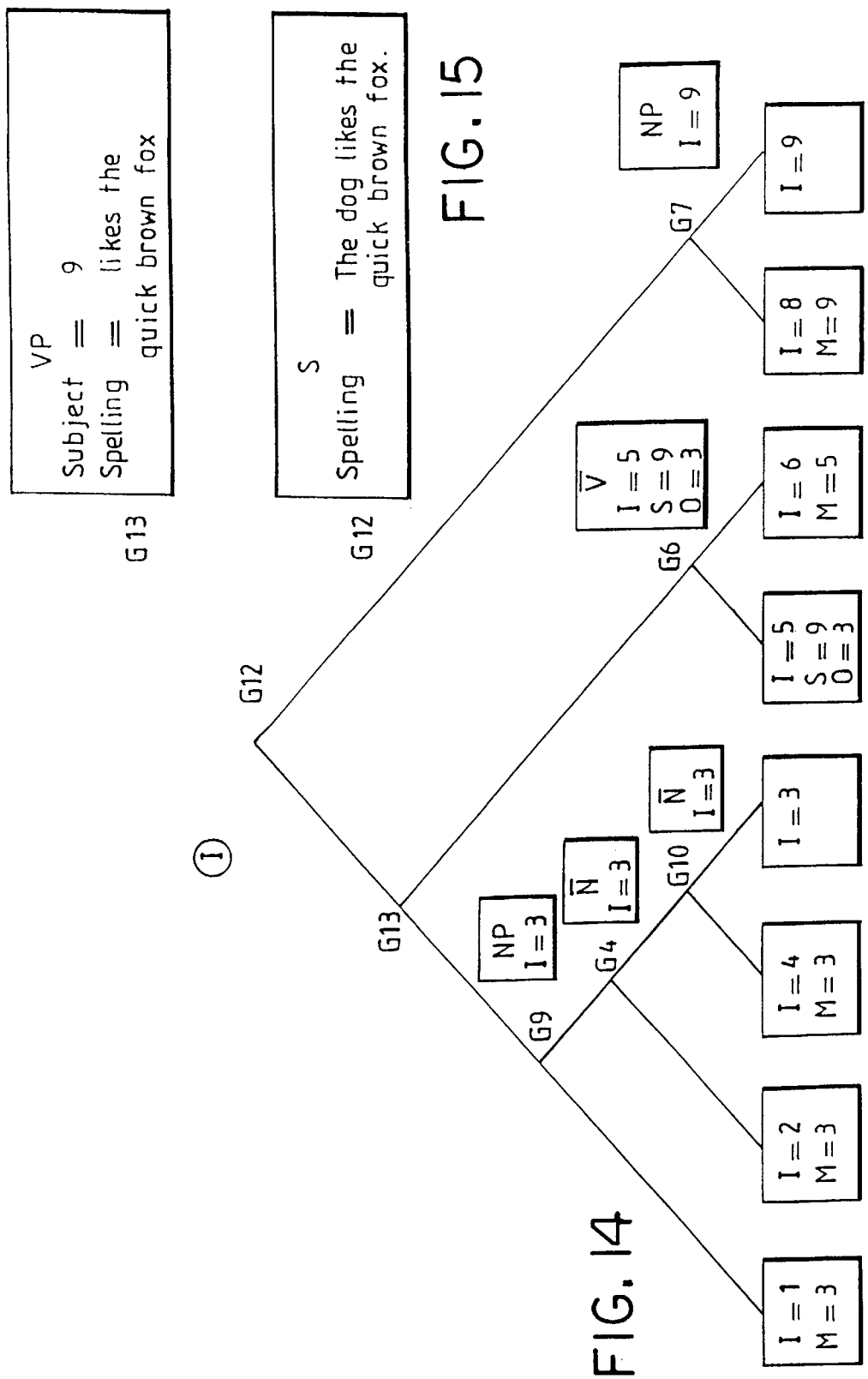

The evaluator 105 evaluates the tree shown in FIG. 14 starting at the node G12. This is not well formed and so the evaluator evaluates the child node in the left branch, namely the node G13. This node is not well formed but is connected to the well formed nodes G9 and G6. The rules shown in FIG. 10 are applied to the labels of the nodes G9 and G6 and, in particular, the rule (e) is fulfilled, when the positions of the nodes G9 and G6 are reversed, the finite verb (node G6) and the noun phrase (node G9) being such that the subject of G6 is equal to the index of G9. As shown in FIG. 15, the node G13 is thus labelled well formed as a verb phrase with the subject equal to 9 and the spelling equal to the spelling of G6 followed by the spelling of G9.

The node G12 can now be evaluated because it is connected to the well formed nodes G13 and G7. The rule (a) is found to be fulfilled when the positions of the nodes G13 and G7 are reversed because the node G7 represents a noun phrase whose index is equal to the subject of the verb phrase at the node G13. The node G12 is therefore labelled as a sentence having as its spelling the spelling of G7 followed by the spelling of G13. The evaluation has been successfully completed to give the final spelling "The dog likes the quick brown fox", as shown in FIG. 15.

The machine translation system thus provides the correct translation in a relatively small number of evaluation steps, thereby reducing the processing time substantially compared with the prior art. By preserving the grammatical relationships during the transformation by the transformer 103 and by not disturbing correctly evaluated structure in the transformer 106, an efficient and elegant technique is provided for translating quickly and accurately from the source language to the target language. In the worst possible case, where there is a number X of target language signs produced by the transformer 103, the evaluator 105 would have to perform less than of the order of $X^4$ evaluations before finding the correct target language sentence or giving up the attempt. In the case of the prior art, because the structure is not transformed and evaluated efficiently, in the worst case for X target language signs, a number of evaluations equal to Xl (factorial X) would be required to find the correct target language sentence or to give up. For realistic values of X representing normal sentences, the difference in processing time between the present machine translation system and known systems can therefore be several orders of magnitude. For instance, in the case of failure to find a translation with ten target language signs, the present system would require less than of the order of 10,000 evaluations whereas the known system would have to perform of the order of 3.5 million evaluations before giving up and acknowledging failure. Thus, with currently available data processing speeds, the present system can be implemented whereas the known system is impractical.

What is claimed is:

1. A machine translation system for translating text in a source language to text in a target language, comprising: an input interface for putting text in the source language into the system; an analyser for analysing a grammatically complete section of the input text into source language signs, each of which has an associated label comprising an identifier for identifying the sign and data identifying any other sign to which the sign is grammatically related; a first transformer for transforming the source language signs to target language signs including transforming the identifiers and the data; a combiner for combining the target language signs into a target language structure such that each target language sign is associated with at least one other target language sign; an evaluator for evaluating the target language structure so as to identify, from the identifiers and the data of the target language signs, well formed substructures and target language signs not forming part of a well formed substructure; and a second transformer for transforming the target language structure without dissociating from each other target language signs forming well formed substructures identified by the evaluator, the evaluator and the second transformer alternately evaluating and transforming the target language structure.

2. A system as claimed in claim 1, wherein the evaluator is arranged, following a transformation of the target language structure by the second transformer such that at least one well formed substructure is unchanged, not to re-evaluate the or each unchanged well formed substructure.

3. A system as claimed in claim 1, wherein the evaluator comprises a further syntactic analyser for analysing the grammatical relationship between the target language signs in the target language structure.

4. A system as claimed in claim 1, wherein the second transformer is arranged to associate a first well formed substructure having an associated label or a first target language sign not forming part of a well formed substructure with a second well formed substructure having an associated label or a second target language sign such that the identifier of one of the first and second target language signs or well formed substructures is included in the data of the other of the first and second target language signs or well formed substructures.

5. A system as claimed in claim 4, wherein the target language structure comprises a hierarchical structure of nodes with the target language signs at the lowest order nodes and the second transformer is arranged to associate the first target language sign or well formed substructure with the second target language sign or well formed substructure of highest nodal order.

6. A system as claimed in claim 1, wherein the evaluator is arranged, following transformation of the target language structure by the second transformer such that at least one well formed substructure is changed, to re-evaluate the or each changed substructure in respect only of change therein.

7. A system as claimed in claim 6, wherein the evaluator is arranged to evaluate the target language structure in accordance with a monotonic grammar and, following transformation of the target language structure by the second transformer such that a third target language sign or well formed substructure becomes associated with a fourth target language sign or well formed substructure forming part of a fifth well formed substructure, to re-evaluate the fifth well formed substructure only in respect of the association between the third and fourth target language signs and well formed substructures.

8. A system as claimed in claim 1, wherein the analyser comprises a morphological analyser for analysing the input text into source language morphemes and a syntactic analyser for analysing the grammatical relationships between the morphemes to produce the source language signs.

9. A system as claimed in claim 8, wherein the syntactic analyser is arranged to supply a source language structure of the input text to the combiner, which is arranged to form the target language structure to resemble the source language structure.

* * * * *